(12) United States Patent
Ghosh et al.

(10) Patent No.: US 8,355,976 B2
(45) Date of Patent: Jan. 15, 2013

(54) FAST AND ACCURATE METHOD FOR ESTIMATING PORTFOLIO CVAR RISK

(75) Inventors: Soumyadip Ghosh, Peekskill, NY (US); Pu Huang, Yorktown Heights, NY (US); Dharmashankar Subramanian, Stamford, CT (US); Jie Xu, Buffalo Grove, IL (US)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 13/008,123

(22) Filed: Jan. 18, 2011

(65) Prior Publication Data

US 2012/0185406 A1 Jul. 19, 2012

(51) Int. Cl.
*G06Q 40/00* (2012.01)
(52) U.S. Cl. .......................... 705/36 R; 705/35; 705/38
(58) Field of Classification Search ........................ None
See application file for complete search history.

(56) References Cited

U.S. PATENT DOCUMENTS

| | | | | |
|---|---|---|---|---|
| 6,085,175 A * | 7/2000 | Gugel et al. | ................ | 705/36 R |
| 6,609,109 B1 * | 8/2003 | Bradley et al. | ................ | 705/35 |
| 7,409,357 B2 * | 8/2008 | Schaf et al. | ................ | 705/7.28 |
| 7,546,270 B1 * | 6/2009 | Zhao | ............................ | 705/38 |
| 7,778,897 B1 * | 8/2010 | Rachev et al. | ................ | 705/35 |
| 7,930,232 B2 * | 4/2011 | Cooper et al. | ............. | 705/36 R |
| 8,112,340 B2 * | 2/2012 | Watson et al. | ............. | 705/36 R |
| 2002/0161690 A1 * | 10/2002 | McCarthy et al. | ............. | 705/37 |
| 2003/0061152 A1 * | 3/2003 | De et al. | ............................ | 705/38 |
| 2003/0115125 A1 * | 6/2003 | Lee et al. | .................... | 705/36 |
| 2003/0139993 A1 * | 7/2003 | Feuerverger | ................ | 705/36 |
| 2005/0033678 A1 * | 2/2005 | Huneault | ................ | 705/36 |
| 2005/0033679 A1 * | 2/2005 | Rachev et al. | ................ | 705/36 |
| 2005/0065754 A1 * | 3/2005 | Schaf et al. | ................ | 702/188 |
| 2005/0207531 A1 * | 9/2005 | Dempsey et al. | ............. | 378/65 |
| 2006/0116945 A1 * | 6/2006 | Nishikawa | .................... | 705/35 |
| 2007/0027698 A1 * | 2/2007 | Daul et al. | ........................ | 705/1 |
| 2007/0156555 A1 * | 7/2007 | Orr | .................... | 705/35 |
| 2008/0133427 A1 * | 6/2008 | Watson et al. | ............. | 705/36 R |
| 2008/0294565 A1 * | 11/2008 | Kongtcheu | ................ | 705/36 R |
| 2009/0006275 A1 * | 1/2009 | Takano et al. | ............. | 705/36 R |
| 2009/0018966 A1 * | 1/2009 | Clark et al. | ................ | 705/36 R |
| 2009/0112774 A1 * | 4/2009 | Meucci | ................ | 705/36 R |
| 2009/0182598 A1 * | 7/2009 | An et al. | .......................... | 705/7 |
| 2009/0240632 A1 * | 9/2009 | Cunningham et al. | ...... | 705/36 R |

(Continued)

FOREIGN PATENT DOCUMENTS

WO  WO 2009009593 A1 *  1/2009

OTHER PUBLICATIONS

Computational aspects of minimizing conditional value-at-risk; Künzi-bay, Alexandra; Mayer, János; Computational Management Science 3. 1; Jan. 2006; 26-pages.*

(Continued)

*Primary Examiner* — Gregory Johnson
(74) *Attorney, Agent, or Firm* — Scully, Scott, Murphy & Presser, P.C.; Daniel P. Morris, Esq.

(57) ABSTRACT

A method, system and computer program product for measuring a risk of an asset portfolio. The system estimates a β-level CVaR (Conditional Value-at-Risk) of the asset portfolio by modeling interdependencies between assets in the asset portfolio. The modeling is based on Gaussian copula model.

24 Claims, 3 Drawing Sheets

U.S. PATENT DOCUMENTS

| | | | | |
|---|---|---|---|---|
| 2009/0271230 | A1* | 10/2009 | Huang et al. | 705/7 |
| 2010/0145875 | A1* | 6/2010 | Schmid et al. | 705/36 R |
| 2010/0332411 | A1* | 12/2010 | Rachev et al. | 705/36 R |
| 2011/0035073 | A1* | 2/2011 | Ozog | 700/291 |
| 2011/0145168 | A1* | 6/2011 | Dirnstorfer et al. | 705/36 R |
| 2011/0276514 | A1* | 11/2011 | Kalagnanam et al. | 705/348 |
| 2012/0185406 | A1* | 7/2012 | Ghosh et al. | 705/36 R |

OTHER PUBLICATIONS

Conditional value at risk and related linear programming models for portfolio optimization; Mansini, Renata; Ogryczak, Wlodzimierz; Speranza, M Grazia; Annals of Operations Research 152. 1; Jul. 2007; 31-pages.*

An estimation-free-robust conditional value-at-risk portfolio allocation model; Jabbour, Carlos;Peña, Javier F;Vera, Juan C;Zuluaga, Luis F; The Journal of Risk; Fall 2008; 11, 1; 22-pages.*

Portfolio Optimization under Lower Partial Risk Measures; Konno, Hiroshi;Waki, Hayato;Yuuki, Atsushi; Asia-Pacific Financial Markets; Jun. 2002; 9, 2; 14-pages.*

Valid inequalities and restrictions for stochastic programming problems with first order stochastic dominance constraints; Nilay Noyan and Andrzej Ruszczynski; Mathematical Programming 114. 2; Aug. 2008; 28-pages.*

Efficient execution in the secondary mortgage market—a stochastic optimization model using CVaR constraints; Wang, Chung-Jui and Uryasev, Stan; The Journal of Risk; Fall 2007; 10, 1; 26-pages.*

Worst-Case Conditional Value-at-Risk with Application to Robust Portfolio Management; Zhu, Shushang; Fukushima, Masao; Operations Research, vol. 57, No. 5; Sep.-Oct. 2009; 17-pages.*

Algorithms for handling CVaR constraints in dynamic stochastic programming models with applications to finance; Fábián, Csaba I and Veszprémi, Anna; The Journal of Risk vol. 10, No. 3; Spring 2008; 21-pages.*

Stochastic models for risk estimation in volatile markets—a survey; Stoyan V. Stoyanov; Annals of Operations Research, 176, 1; Apr. 2010; 18-pages.*

Strategic foreign reserves risk management—Analytical framework; Stijn Claessens and Jerome Kreuser; Annals of Operations Research, 152, 1; Jul. 2007; 36-pages.*

Integrated Risk Return Optimization Approach for the Bank Portfolio; Theiler, Ursula A; Finance India; Dec. 2003; 17, 4; 7-pages.*

Optimal selection of a portfolio of options under Value-at-Risk constraints—a scenario approach; M. Schyns; Annals of Operations Research, 181, 1; Dec. 2010; 27-pages.*

Credit risk optimization using factor models; David Saunders; Annals of Operations Research, 152, 1; Jul. 2007; 30-pages.*

Generalized deviations in risk analysis; R. Tyrrell Rockafellar; Finance and Stochastics, 10, 1; Jan. 2006; 25-pages.*

Portfolio Optimization with Conditional Value-at-Risk Objective and Constraints; 2002; 26-pages.*

Kotsiantis, S.B., "Supervised Machine Learning: A Review of Classification Techniques" Informatica (2007) pp. 249-268, vol. 31.

Artzner, P. et al., "Coherent Measures of Risk" Mathematical Finance (1999) pp. 203-228, vol. 9(3).

Luthi, H.J. et al., "Convex Risk Measures for Portfolio Optimization and Concepts of Flexibility" (Jan. 26, 2005) pp. 1-21.

Niaki, S. et al., "Generating Correlation Matrices for Normal Random Vectors in NORTA Algorithm Using Artificial Neural Networks" Journal of Uncertain Systems (2008) pp. 192-201, vol. 2(3).

Benninga, S. et al., "Value-at-Risk (VaR)" Mathematica in Education and Research (1998) pp. 1-8, vol. 7(4).

Mosegaard, K. et al., "Monte Carlo Sampling of Solutions to Inverse Problems" Journal of Geophysical Research (1995) pp. 431-448, vol. 100(B7).

Baker, K., "Singular Value Decomposition Tutorial" (Mar. 29, 2005) pp. 1-24.

Pflug, G., "Some Remarks no the Value-at-Risk and the Conditional Value-at-Risk" Department of Statistics and Decision Support Systems University of Vienna, Chapter 1, pp. 1-10.

* cited by examiner

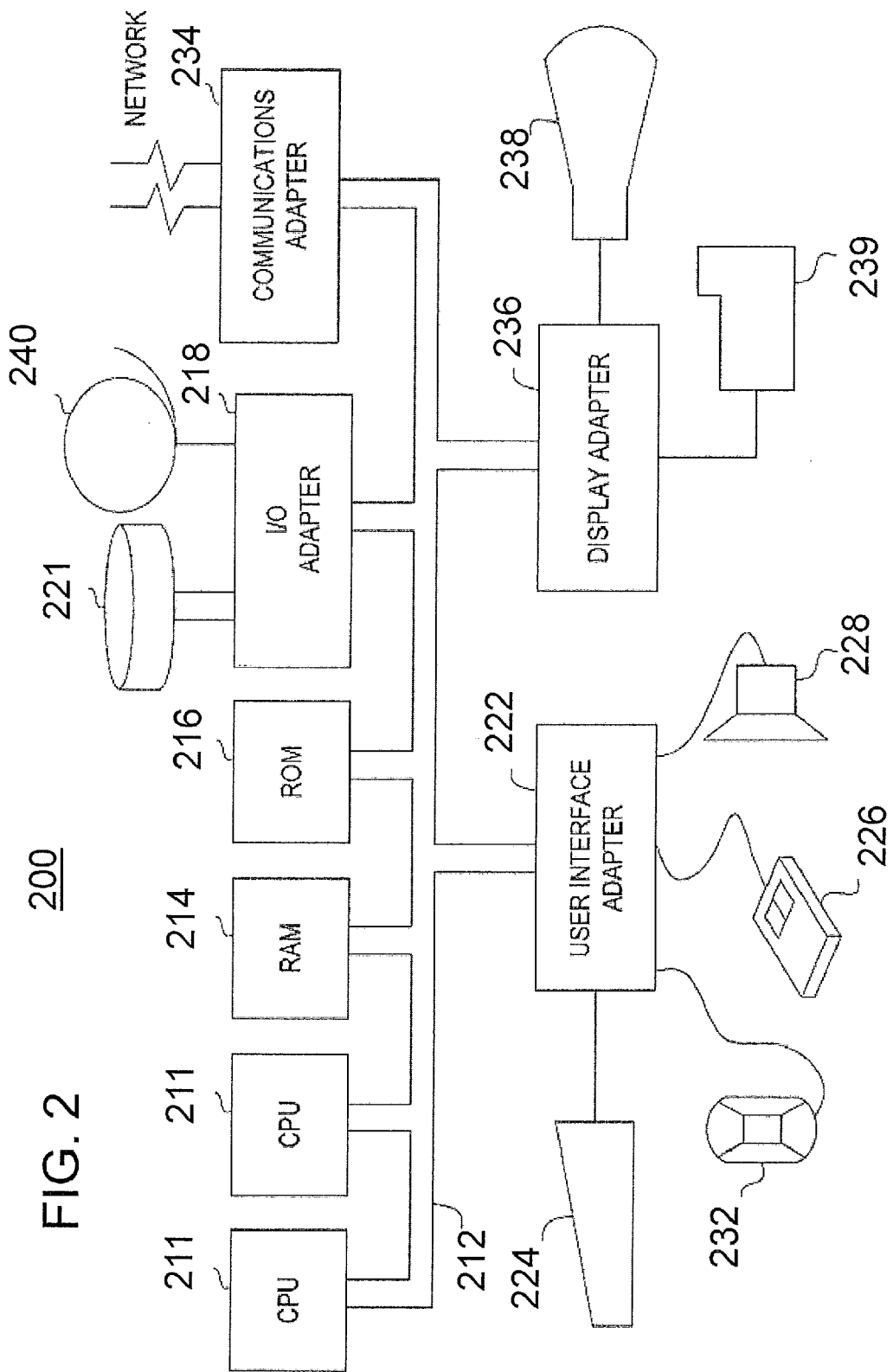

FAST AND ACCURATE METHOD FOR ESTIMATING PORTFOLIO CVAR RISK

BACKGROUND

The present invention relates to portfolio risk management, and more particularly to calculating the Conditional Value-at-Risk (CVaR), a widely used risk measure, for a portfolio.

One of the main objectives of portfolio risk management is to evaluate and improve the performance of the portfolio while reducing exposure to a financial loss. A financial portfolio refers to a collection of investments owned by an individual or an organization. An investment includes, but is not limited to, a stock, a bond, a currency, a derivative, a mutual fund, a hedge fund, cash equivalents, etc. A risk refers to a likelihood of losing investment values in a portfolio. Estimating the risk of a portfolio through a simulation (e.g., Monte Carlo simulation or any other equivalent simulation), is a fundamental task in portfolio risk management. Different measures of risk call for different simulation techniques.

A standard benchmark for a measurement of a risk is "Value-at-Risk" (VaR). For a given confidence level $\beta$ ($0<\beta<1$, typical $\beta=95\%$), the $\beta$-level VaR is the loss in the portfolio's value that is exceeded with the probability $1-\beta$. However, as a risk measure, VaR lacks coherency in the sense that it does not necessarily encourage diversification. This is because the VaR value of a combination of two portfolios can be greater than the sum of VaR values of the individual portfolios. Philippe Artzner, et al. "Coherent Measure of Risk," Mathematical Finance, vol. 9, no. 3, July 1999, pp. 203-228, wholly incorporated by reference, describes VaR in detail.

An alternative risk measure to VaR is "Conditional Value-at-Risk" (CVaR), which is also known as "Average Value-at-Risk", "Mean Excess Loss", "Mean Shortfall" or "Tail VaR". For a given level $\beta$, the $\beta$-level CVaR value is the conditional expectation of the loss above the $\beta$-level VaR value. The value of CVaR is always greater than or equal to that of the corresponding VaR. CVaR can be calculated by generating random samples to simulation losses of a portfolio, and then averaging those samples that are greater than the VaR value.

SUMMARY OF THE INVENTION

In one embodiment, the present invention describes a system, method and computer program product for measuring a risk of a portfolio.

In one embodiment, there is provided a system for measuring a risk of a portfolio. The system comprises at least one memory device and at least one processor connected to the memory device. The system estimates the CVaR (Conditional Value-at-Risk) of the portfolio.

In a further embodiment, there is provided a method for measuring a risk of a portfolio, the method comprising of estimating, by a computing system, a $\beta$-level CVaR of a portfolio where $\beta$ is a real number between 0 and 1.

In a further embodiment, the portfolio comprises n number of assets, and $a_i$, $i=1,\ldots,n$, is the number of shares invested in an asset i.

In a further embodiment, a Gaussian copula model captures the interdependency between the assets in the portfolio. The Gaussian copula model is represented by n marginal Cumulative Distribution Functions (CDF) $F_i(\cdot)$, and a n×n matrix $\Sigma_Z$, wherein $F_i(\cdot)$ is a marginal CDF of the potential loss of asset i, and $\Sigma_Z$ is a correlation matrix that captures interdependencies among asset losses.

In a further embodiment, the computing system applies a singular value decomposition or other equivalent matrix decomposition technique on the correlation matrix $\Sigma_Z$ to decompose it as $\Sigma_Z=U^TDU$, where D is a diagonal matrix with non-negative diagonal entries, and U is a unitary matrix (i.e., $U^TU=UU^T=I_n$, where $I_n$ is the n×n identify matrix). The computing system generates J number of sample points $V^1,\ldots,V^J$ from a standard n-dimensional multivariate normal distribution whose mean value is zero and whose correlation matrix is $I_n$. The computing system then creates J number of points $Z^1,\ldots,Z^J$, by multiplying $D^{1/2}$ and $U^T$ to $V^1,\ldots,V^J$ as $Z^j=D^{1/2}U^TV^j$, where an index j ranges from 1 to J. The computing system further creates J number of points $X^1,\ldots,X^J$ by calculating $X_i^j=F_i^{-1}(\Phi(Z_i^j))$, where the asset i ranges from 1 to n, the sample point index j ranges from 1 to J, $Z_i^j$ is the i-th entry of $Z^j$, $X_i^j$ is the i-th entry of $X^j$, $F_i^{-1}(\cdot)$ is the inverse function of $F_i(\cdot)$, and $\Phi(\cdot)$ is the univariate standard normal CDF. The computing system computes empirical losses $L^1,\ldots,L^J$ as $L^j=a^TX^j$, where the index j ranges from 1 to J. The computing system then sorts $L^1,\ldots,L^J$ in an ascending order. Let $L^{(1)},\ldots,L^{(J)}$ denote the sorted $L^1,\ldots,L^J$ with $L^{(1)}\leq\ldots\leq L^{(J)}$, and K denote the largest integer such that $J-K\geq J(1-\beta)$, i.e., $K=\max\{j|J-j\geq J(1-\beta), j=1,\ldots,J\}$. The computing system estimates a $\beta$-level VaR of total portfolio loss L as $L^{(K)}$. The computing system divides points $X^1,\ldots,X^J$ into two groups, a first group and a second group. The first group includes those $X^j$'s that satisfy $a^TX^j\geq L^{(K)}$. The second group includes remainders. The computing system divides points $V^1,\ldots,V^J$ into two groups, a third group and a fourth group. The third group includes those $V^j$'s whose corresponding $X^j$'s belong to the first group. The fourth group includes remaining $V^j$'s. The computing system finds a hyper-plane that separates the third group and the fourth group. In one embodiment, to find the separating hyper-plane, the computing system applies a binary classification technique or other classification technique to the points $V^1,\ldots,V^J$. The computing system represents the separating hyper-plane as $f(x)=k^Tx-b=0$, where k is a unit normal vector (i.e., $k^Tk=1$) of the function, $|b|$ (i.e., the absolute value of b) is a distance from the origin (0,0) to the hyper-plane. The computing system computes a shifting amount $\Delta Z$ as $\Delta Z=bD^{1/2}U^Tk$. The computing system shifts the points $Z^1,\ldots,Z^J$ by $\Delta Z$, and creates points $Y^1,\ldots,Y^J$ from the shifted points as $Y_i^j=F_i^{-1}(\Phi(Z_i^j+\Delta Z_i))$, where the asset i ranges from 1 to n, the index j ranges 1 to J. The computing system computes a set of likelihood ratios $w^1,\ldots,w^J$ as $$w^j = \frac{\phi_Z(Z^j+\Delta Z)}{\phi_{Z+\Delta Z}(Z^j+\Delta Z)},$$

where the index j ranges from 1 to J, $\phi_Z(\cdot)$ is the joint probability density function (PDF) of a n-dimensional multivariate normal distribution whose mean value is zero, and whose correlation matrix is the correlation matrix $\Sigma_Z$, and $\phi_{Z+\Delta Z}(\cdot)$ is the joint PDF of a n-dimensional multivariate normal distribution whose mean value is $\Delta Z=bD^{1/2}U^Tk$ and whose correlation matrix is the correlation matrix $\Sigma_Z$. The computing system computes "exaggerated" empirical losses $\tilde{L}^1,\ldots,\tilde{L}^J$ as $\tilde{L}^j=a^TY^j$, $j=1,\ldots,J$, and sorts $\tilde{L}^1,\ldots,\tilde{L}^J$ in an ascending order, and denotes the sorted a $\tilde{L}^1,\ldots,\tilde{L}^J$ as $\tilde{L}^{(1)},\ldots,\tilde{L}^{(J)}$ with $\tilde{L}^{(1)}\leq\ldots\leq\tilde{L}^{(J)}$. Let $w^{(j)}$ be the corresponding likelihood ratio of the j-th smallest element $\tilde{L}^{(j)}$. The computing system finds the largest integer S between 1 and J such that the sum of $w^{(j)}$ from S to J is larger than $J(1-\beta)$, i.e., $$S = \max\left\{s \;\middle|\; \sum_{j=s}^{J} w^{(j)} \geq J(1-\beta), s=1, \ldots, J\right\}.$$

The computing system estimates the $\beta$-level CVaR value of the total portfolio loss L, $CVaR_\beta(L)$ as $$CVaR_\beta(L) = \left(\sum_{j=S}^{J} w^{(j)} a^T Y^j\right) \bigg/ \left(\sum_{j=S}^{J} w^{(j)}\right).$$

BRIEF DESCRIPTION OF THE DRAWINGS

The accompanying drawings are included to provide a further understanding of the present invention, and are incorporated in and constitute a part of this specification.

FIG. 2 illustrates an exemplary hardware configuration for implementing the flow chart depicted in FIGS. 1A-1B in one embodiment.

DETAILED DESCRIPTION

A portfolio may comprise an arbitrary number of assets. The potential loss of each asset is a random variable that may follow an arbitrary probability distribution. Gaussian copula model or other equivalent models captures interdependence among asset losses in the portfolio. The present invention describes a system, method and computer program product to estimate CVaR (Conditional Value-at-Risk) of the portfolio.

More specifically, let n denote the number of assets included in the portfolio, random variable $Q_i$, $i=1, \ldots, n$, denote a potential loss of an asset i, and $a_i$, $i=1, \ldots, n$, denote the number of shares invested in the asset i. A total portfolio loss L can be represented by $L = a_1 Q_1 + \ldots + a_n Q_n = a^T Q$, where $a = [a_1, \ldots, a_n]^T$ and $Q = [Q_1, \ldots, Q_n]^T$ are column vectors of $a_i$'s and $Q_i$'s, and $a^T$ represents the transpose of column vector a. The present invention describes a system, method and computer program product to estimate, $CVaR_\beta(L)$, a $\beta$-level CVaR, of the portfolio, where $\beta$ is a real number between 0 and 1.

In one embodiment, interdependence among asset losses $Q_i$'s is captured by a Guassian copula model or other equivalent models. The Gaussian copula model consists of n number of culmulative distribution functions (CDF) corresponding to n number of random variables $Q_i$'s, and a n×n correlation matrix. Let $F_i(\cdot)$ denote the CDF of $Q_i$, and $\Sigma_Z$ denote the correlation matrix.

Figure 1A:
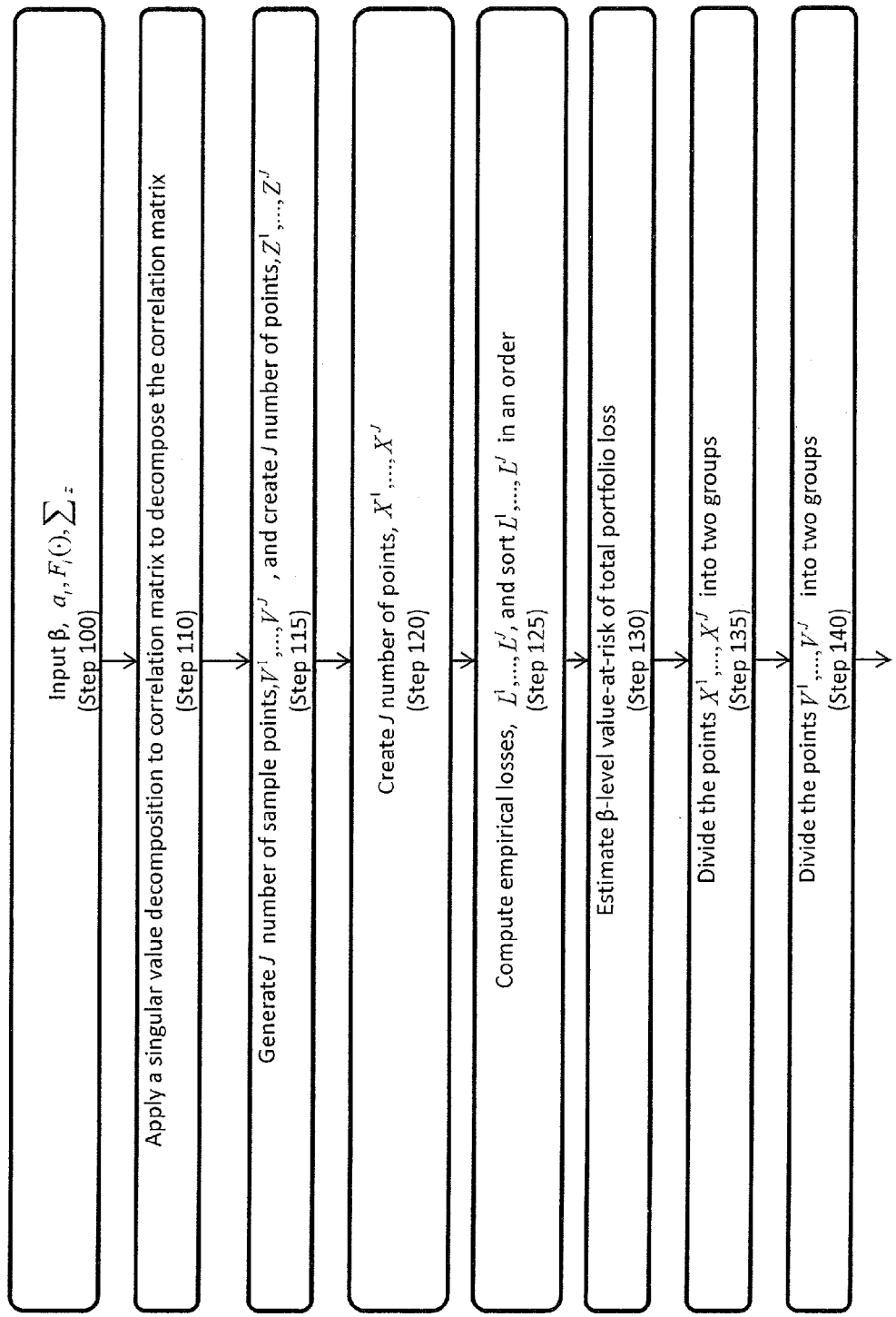
FIGS. 1A-1B illustrate a flow chart that describes method steps for measuring a risk of an asset portfolio in one embodiment.
Figure 1B:
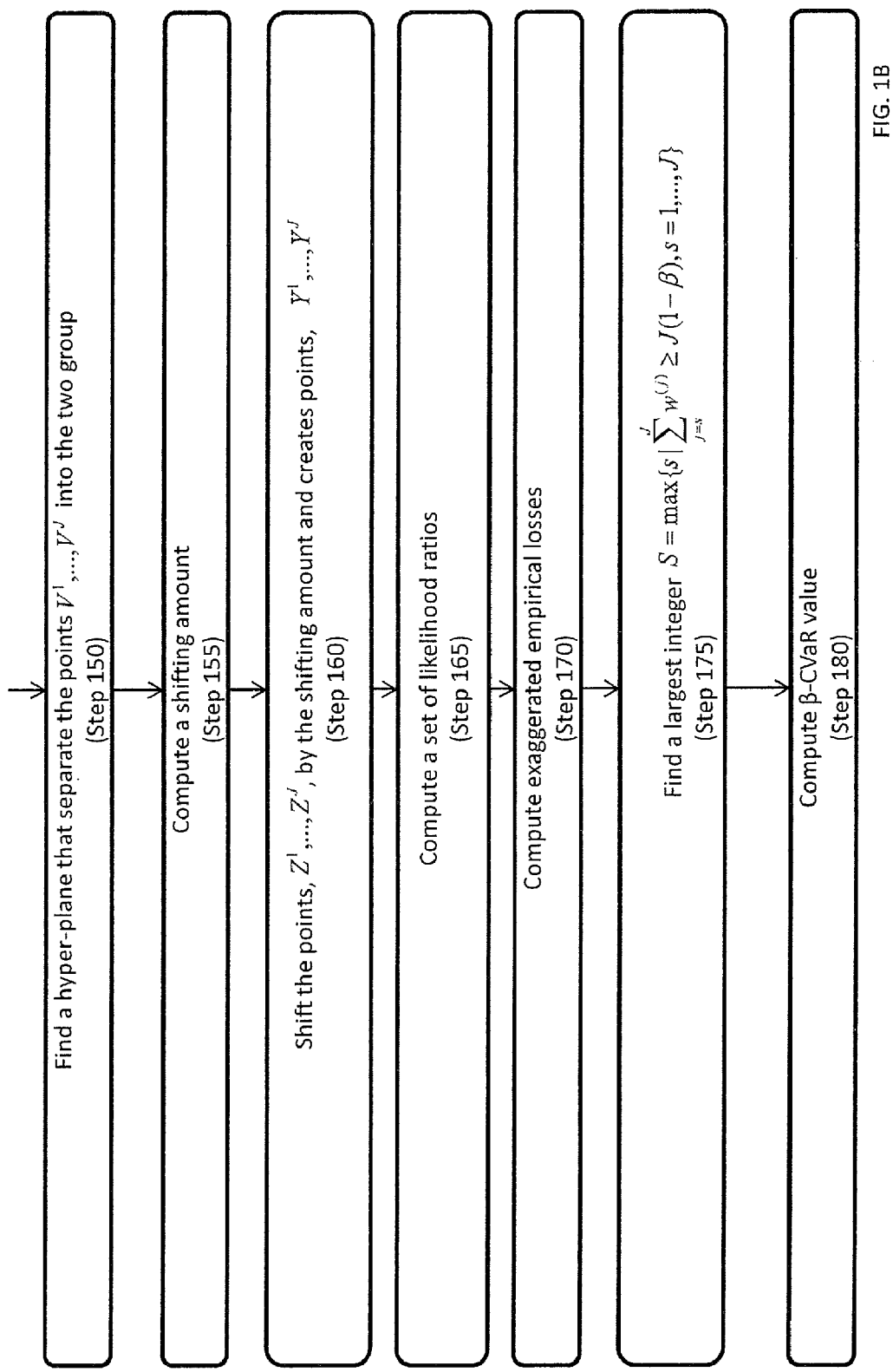

FIGS. 1A-1B illustrate a flow chart that describes method steps for measuring a risk of an asset portfolio in one embodiment. At step 100, a user inputs $\beta$, $a_i$, $F_i(\cdot)$, and $\Sigma_Z$ to a computing system (e.g., a computing system 200 in FIG. 2), e.g., via a user interface (not shown), a keyboard (e.g., a keyboard 224 in FIG. 2), etc.

At step 110, the computing system applies a singular value decomposition or other equivalent matrix decomposition technique on the correlation matrix $\Sigma_Z$ to decompose it as $\Sigma_z = U^T D U$, where D is a diagonal matrix with non-negative diagonal entries, and U is a unitary matrix (i.e., $U^T U = U U^T = I_n$, where $I_n$ is an n×n identify matrix). Note that this is possible because $\Sigma_Z$ is a correlation matrix and thus is positive semi-definite.

At step 115, the computing system generates J number of sample points $V^1, \ldots, V^T$ from a standard n-dimensional multivariate normal distribution whose mean value is zero and whose correlation matrix is $I_n$. The computing system then creates J number of points $Z^1, \ldots, Z^J$, e.g., by multiplying $D^c$ and $U^T$ to $V^1, \ldots, V^J$ as $Z^j = D^{1/2} U^T V^j$, where an index j ranges from 1 to J.

At step 120, the computing system further creates J number of points $X^1, \ldots, X^J$, e.g., by calculating $X_i^j = F_i^{-1}(\Phi(Z_i^j))$, where the asset i ranges from 1 to n, a sample point index j ranges from 1 to J, $Z_i^j$ is the i-th entry of $Z^j$, $X_i^j$ is the i-th entry of $X^j$, $F_i^{-1}(\cdot)$ is the inverse function of $F_i(\cdot)$, and $\Phi(\cdot)$ is the univariate standard normal CDF.

At step 125, the computing system computes empirical losses $L^1, \ldots, L^J$ as $L^j = a^T X^j$, where the index j ranges from 1 to J. The computing system then sorts $L^1, \ldots, L^J$, for example, in an ascending order. Let $L^{(1)}, \ldots, L^{(J)}$ denote the sorted $L^1, \ldots, L^J$ with $L^{(1)} \leq \ldots \leq \ldots L^{(J)}$, and K denote the largest integer such that $J - K \geq J(1-\beta)$, i.e., $$K = \max\{j | J - j \geq J(1-\beta), j=1, \ldots, J\}.$$

At step 130, the computing system estimates a $\beta$-level VaR (Value-at-Risk) of the total portfolio loss L as $L^{(K)}$. At step 135, the computing system divides points $X^1, \ldots, X^J$, for example, into two groups, a first group and a second group. The first group includes those $X^j$'s that satisfy $a^T X^j \geq L^{(K)}$. The second group includes remainders. At step 140, the computing system divides points $V^1, \ldots, V^J$ into two groups, a third group and a fourth group. The third group includes those $V^j$'s whose corresponding $X^j$'s belong to the first group. The fourth group includes remaining $V^j$'s.

At step 150, the computing system finds a hyper-plane that separates the third group and the fourth group. In one embodiment, to find the separating hyper-plane, the computing system applies a binary classification technique or other classification technique to the points $V^1, \ldots, V^J$. See, for example, S. B. Kotsiantis, "Supervised Machine Learning: A Review of Classification Techniques," Informatica 31, 2007, pp. 249-268, wholly incorporated by reference as if set forth herein, for details on classification techniques. The computing system represents the separating hyper-plane as $f(x) = k^T x - b = 0$, where k is a unit normal vector (i.e., $k^T k = 1$) of the hyper-plane, $|b|$ (i.e., the absolute value of b) is a distance from the origin (0,0) to the hyper-plane.

At step 155, the computing system computes a shifting amount $\Delta Z$ as $\Delta Z = b D^{1/2} U^T k$.

At step 160, the computing system shifts the points $Z^1, \ldots, Z^J$ by $\Delta Z$, and creates points $Y^1, \ldots, Y^J$ from the shifted points as $Y_i^j = F_i^{-1}(\Phi(Z_i^j + \Delta Z_i))$, where the asset i ranges from 1 to n, the index j ranges 1 to J. At step 165, the computing system computes a set of likelihood ratios $w^1, \ldots, w^J$ as $$w^j = \frac{\phi_Z(Z^j + \Delta Z)}{\phi_{Z+\Delta Z}(Z^j + \Delta Z)},$$

where the index j ranges from 1 to J, $\Phi_Z(\cdot)$ is the joint probability density function (PDF) of a n-dimensional multivariate normal distribution whose mean value is zero, and whose correlation matrix is the correlation matrix $\Sigma_Z$, and $\Phi_{Z+\Delta Z}(\cdot)$ is the joint PDF of a n-dimensional multivariate normal distribution whose mean value is $\Delta Z = b D^c U^T k$ and whose correlation matrix is the correlation matrix $\Sigma_Z$.

At step 170, the computing system computes "exaggerated" empirical losses $\tilde{L}^1, \ldots, \tilde{L}^J$ as $\tilde{L}^j = a^T Y^j$, $j=1, \ldots, J$, and sorts $\tilde{L}^1, \ldots, \tilde{L}^J$, for example, in an ascending order, and denotes the sorted $\tilde{L}^1, \ldots, \tilde{L}^J$ as $\tilde{L}^{(1)}, \ldots, \tilde{L}^{(J)}$ with $\tilde{L}^{(1)} \leq \ldots \leq \tilde{L}^{(J)}$. Let $w^{(j)}$ be the corresponding likelihood ratio of the j-th smallest element $\tilde{L}^{(j)}$. At step 175, the computing system finds the largest integer S between 1 and J such that the sum of $w^{(j)}$ from S to J is larger than $J(1-\beta)$, i.e., $$S = \max\left\{s \;\middle|\; \sum_{j=s}^{J} w^{(j)} \geq J(1-\beta), s = 1, \ldots, J\right\}.$$

At step 180, the computing system estimates the β-level CVaR value of the total portfolio loss L, $CVaR_\beta(L)$ as $$CVaR_\beta(L) = \left(\sum_{j=S}^{J} w^{(j)} a^T Y^j\right) \middle/ \left(\sum_{j=S}^{J} w^{(j)}\right).$$

The estimated β-level CVaR value of the total portfolio loss L reflects a possible loss in the portfolio. Thus, a user (e.g., a fund manager, a stock portfolio manager, etc.) may utilize this estimated β-level CVaR value of the total portfolio loss L to find out a possible or potential loss in an asset portfolio.

FIG. 2 illustrates an exemplary hardware configuration of a computing system 200 running and/or implementing the method steps in FIG. 1. The hardware configuration preferably has at least one processor or central processing unit (CPU) 211. The CPUs 211 are interconnected via a system bus 212 to a random access memory (RAM) 214, read-only memory (ROM) 216, input/output (I/O) adapter 218 (for connecting peripheral devices such as disk units 221 and tape drives 240 to the bus 212), user interface adapter 222 (for connecting a keyboard 224, mouse 226, speaker 228, microphone 232, and/or other user interface device to the bus 212), a communication adapter 234 for connecting the system 200 to a data processing network, the Internet, an Intranet, a local area network (LAN), etc., and a display adapter 236 for connecting the bus 212 to a display device 238 and/or printer 239 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method for measuring a risk of a portfolio including n number of assets, the method comprising:
    estimating, by a computing system, a $\beta$-level CVaR (Conditional Value-at-Risk) of the portfolio by calculating $$CVaR_\beta(L) = \left(\sum_{j=S}^{J} w^{(j)} a^T Y^j\right) \bigg/ \left(\sum_{j=S}^{J} w^{(j)}\right),$$

where $\beta$ is a real number between 0 and 1, L is a total portfolio loss, j is an index, J is an integer representing a specific number of sample points, S is a largest integer between 1 and J such that a sum of $w^{(j)}$ from S and J is larger than $J(1-\beta)$, where $w^{(j)}$ is a likelihood ratio of a j-th smallest empirical loss, $a^T Y^j$ is an empirical loss.

2. The method according to claim 1, further comprising:
    capturing an interdependency between assets in the portfolio using a Gaussian copula model.

3. The method according to claim 2, wherein the Gaussian copula model is represented by n marginal Cumulative Distribution Functions (CDF) $F_i(\cdot)$ and a n×n matrix $\Sigma_Z$, wherein $F_i(\cdot)$ is a marginal CDF of a potential loss of an asset i, and $\Sigma_Z$ is a correlation matrix that captures interdependencies among asset losses.

4. The method according to claim 3, wherein the estimating the $\beta$-level CVaR further includes steps of:
    applying a matrix decomposition technique on the correlation matrix $\Sigma_Z$ to decompose the correlation matrix $\Sigma_Z$ as $\Sigma_Z = U^T D U$, where D is a diagonal matrix with non-negative diagonal entries, and U is a unitary matrix;
    generating J number of sample points $V^1, \ldots, V^J$ from a standard n-dimensional multivariate normal distribution whose mean value is zero and whose correlation matrix is an n×n identify matrix, and creating J number of points $Z^1, \ldots, Z^J$, by multiplying $D^c$ and $U^T$ to $V^1, \ldots, V^J$ as $Z^j = D^{1/2} U^T V^j$, where a sample point index j ranges from 1 to J;
    creating J number of points $X^1, \ldots, X^J$ by calculating $X_i^j = F_i^{-1}(\Phi(Z_i^j))$, where the asset i ranges from 1 to n, the sample point index j ranges from 1 to J, $Z_i^j$ is the i-th entry of $Z^j$, $X_i^j$ is an i-th entry of $X^j$, $F_i^{-1}(\cdot)$ is the inverse function of $F_i(\cdot)$, and $\Phi(\cdot)$ is the univariate standard normal CDF;
    computing empirical losses $L^1, \ldots, L^J$ as $L^j = a^T X^j$, where the index j ranges from 1 to J, then sorting $L^1, \ldots, L^J$ in an ascending order, denoting the sorted $L^1, \ldots, L^J$ with $L^{(1)} \leq \ldots \leq L^{(J)}$, and determining a largest integer K such that $J - K \geq J(1-\beta)$ so that $K = \max\{j | J-j \geq J(1-\beta), j=1, \ldots, J\}$;
    estimating a $\beta$-level VaR of total portfolio loss L as $L^{(K)}$;
    dividing points $X^1, \ldots, X^J$ into two groups, a first group and a second group;
    dividing points $V^1, \ldots, V^J$ into two groups, a third group and a fourth group, according to the divided points $X^1, \ldots, X^J$;
    finding a hyper-plane that separates the third group and the fourth group, and representing the separating hyper-plane as $f(x) = k^T x - b = 0$, where k is a unit normal vector ($k^T k = 1$) of the hyper-plane, $|b|$ (the absolute value of b) is a distance from an origin (0,0) to the hyper-plane;
    computing a shifting amount $\Delta Z$ as $\Delta Z = b D^{1/2} U^T k$;
    shifting the points $Z^1, \ldots, Z^J$ by $\Delta Z$, and creating points $Y^1, \ldots, Y^J$ from the shifted points as $Y_i^j = F_i^{-1}(\Phi(Z_i^j + \Delta Z_i))$, where the asset i ranges from 1 to n, the index j ranges 1 to J;
    computing a set of likelihood ratios $w^1, \ldots, w^J$ as $$w^j = \frac{\phi_Z(Z^j + \Delta Z)}{\phi_{Z+\Delta Z}(Z^j + \Delta Z)},$$

where the index j ranges from 1 to J, $\phi_Z(\cdot)$ is a joint probability density function (PDF) of a n-dimensional multivariate normal distribution whose mean value is zero, and whose correlation matrix is the correlation matrix $\Sigma_Z$, and $\phi_{Z+\Delta Z}(\cdot)$ is a joint PDF of a n-dimensional multivariate normal distribution whose mean value is $\Delta Z = b D^{1/2} U^T k$ and whose correlation matrix is the correlation matrix $E\Sigma_Z$;
    computing exaggerated empirical losses $\tilde{L}^1, \ldots, \tilde{L}^J$ as $\tilde{L}^j = a^T Y^j, j=1, \ldots, J$, and sorts $\tilde{L}^1, \ldots, \tilde{L}^J$ in an ascending order, and denoting the sorted $\tilde{L}^1, \ldots, \tilde{L}^J$ as $\tilde{L}^{(1)}, \ldots, \tilde{L}^{(J)}$ with $\tilde{L}^{(1)} \leq \ldots \leq \tilde{L}^{(J)}$; and
    finding the largest integer S so that $$S = \max\left\{s \,\bigg|\, \sum_{j=s}^{J} w^{(j)} \geq J(1-\beta), s=1, \ldots, J\right\}.$$

5. The method according to claim 4, wherein the matrix decomposition technique includes a singular value decomposition technique.

6. The method according to claim 4, wherein $U^T U$ is equal to $UU^T$ which is equal to $I_n$, the $I_n$ being an n×n identify matrix.

7. The method according to claim 4, wherein the first group includes $X^j$'s that satisfy $a^T X^j \geq L^{(K)}$, and the second group includes remainders.

8. The method according to claim 4, wherein the third group includes $V^j$'s whose corresponding $X^j$'s belong to the first group, and the fourth group includes remaining $V^j$'s.

9. A system for measuring a risk of a portfolio including n number of assets, the system comprising:
    at least one memory device; and
    at least one processor connected to the memory device, wherein the processor is configured to:
  estimate a β-level CVaR (Conditional Value-at-Risk) of the portfolio, by calculating $$CVaR_\beta(L) = \left(\sum_{j=S}^{J} w^{(j)} a^T Y^j\right) \bigg/ \left(\sum_{j=S}^{J} w^{(j)}\right),$$

where β is a real number between 0 and 1, L is a total portfolio loss, j is an index, J is an integer representing a specific number of sample points, S is a largest integer between 1 and J such that a sum of $w^{(j)}$ from S and J is larger than $J(1-\beta)$, where $w^{(j)}$ is a likelihood ratio of a j-th smallest empirical loss, $a^T Y^j$ is an empirical loss.

10. The system according to claim 9, wherein the processor is configured to:
  capture an interdependency between the assets in the portfolio using a Gaussian copula model.

11. The system according to claim 10, wherein the Gaussian copula model is represented by n marginal Cumulative Distribution Functions (CDF) $F_i(\cdot)$ and a n×n matrix $\Sigma_Z$, wherein $F_i(\cdot)$ is a marginal CDF of a potential loss of an asset i, and $\Sigma_Z$ is a correlation matrix that captures interdependencies among asset losses.

12. The system according to claim 11, wherein to estimate the β-level CVaR of the portfolio, the processor is further configured to:
  apply a matrix decomposition technique on the correlation matrix $\Sigma_Z$ to decompose the correlation matrix $\Sigma_Z$ as $\Sigma_Z = U^T D U$, where D is a diagonal matrix with non-negative diagonal entries, and U is a unitary matrix;
  generate J number of sample points $V^1, \ldots, V^J$ from a standard n-dimensional multivariate normal distribution whose mean value is zero and whose correlation matrix is an n×n identify matrix, and creating J number of points $Z^1, \ldots, Z^J$, by multiplying $D^c$ and $U^T$ to $V^1, \ldots, V^J$ as $Z^j = D^{1/2} U^T V^j$, where a sample point index j ranges from 1 to J;
  create J number of points $X^1, \ldots, X^J$ by calculating $X_i^j = F_i^{-1}(\Phi(Z_i^j))$, where the asset i ranges from 1 to n, the sample point index j ranges from 1 to J, $Z_i^j$ is the i-th entry of $Z^j$, $X_i^j$ is an i-th entry of $X^j$, $F_i^{-1}(\cdot)$ is the inverse function of $F_i(\cdot)$, and $\Phi(\cdot)$ is the univariate standard normal CDF;
  compute empirical losses $L^1, \ldots, L^J$ as $L^j = a^T X^j$, where the index j ranges from 1 to J, then sorting $L^1, \ldots, L^J$ in an ascending order, denoting the sorted $L^1, \ldots, L^J$ with $L^{(1)} \leq \ldots \leq L^{(J)}$, and determine a largest integer K such that $J - K \geq J(1-\beta)$ so that $K = \max\{j | J-j \geq J(1-\beta), j=1, \ldots, J\}$;
  estimate a β-level VaR of total portfolio loss L as $L^{(K)}$;
  divide points $X^1, \ldots, X^J$ into two groups, a first group and a second group;
  divide points $V^1, \ldots, V^J$ into two groups, a third group and a fourth group, according to the divided points $X^1, \ldots, X^J$;
  find a hyper-plane that separates the third group and the fourth group, and representing the separating hyper-plane as $f(x) = k^T x - b = 0$, where k is a unit normal vector ($k^T k = 1$) of the hyper-plane, $|b|$ (the absolute value of b) is a distance from an origin (0,0) to the hyper-plane;
  compute a shifting amount ΔZ as $\Delta Z = bD^{1/2} U^T k$;
  shifting the points $Z^1, \ldots, Z^J$ by ΔZ, and creating points $Y^1, \ldots, Y^J$ from the shifted points as $Y_i^j = F_i^{-1}(\Phi(Z_i^j + \Delta Z_i))$, where the asset i ranges from 1 to n, the index j ranges 1 to J;

compute a set of likelihood ratios $w^1, \ldots, w^J$ as $$w^j = \frac{\phi_Z(Z^j + \Delta Z)}{\phi_{Z+\Delta Z}(Z^j + \Delta Z)},$$

where the index j ranges from 1 to J, $\phi_Z(\cdot)$ is a joint probability density function (PDF) of a n-dimensional multivariate normal distribution whose mean value is zero, and whose correlation matrix is the correlation matrix $\Sigma_Z$, and $\phi_{Z+\Delta Z}(\cdot)$ is a joint PDF of a n-dimensional multivariate normal distribution whose mean value is $\Delta Z = bD^{1/2} U^T k$ and whose correlation matrix is the correlation matrix $\Sigma_Z$;

compute exaggerated empirical losses $\tilde{L}^1, \ldots, \tilde{L}^J$ as $\tilde{L}^j = a^T Y^j$, $j = 1, \ldots, J$, and sorts $\tilde{L}^1, \ldots, \tilde{L}^J$ in an ascending order, and denoting the sorted $\tilde{L}^1, \ldots, \tilde{L}^J$ as $\tilde{L}^{(1)}, \ldots, \tilde{L}^{(J)}$ with $\tilde{L}^{(1)} \leq \ldots \leq \tilde{L}^{(J)}$; and find the largest integer S so that $$S = \max\left\{s \;\bigg|\; \sum_{j=s}^{J} w^{(j)} \geq J(1-\beta), s = 1, \ldots, J\right\}.$$

13. The system according to claim 12, wherein the matrix decomposition technique includes a singular value decomposition technique.

14. The system according to claim 12, wherein $U^T U$ is equal to $UU^T$ which is equal to $I_n$, the $I_n$ being an n×n identify matrix.

15. The system according to claim 12, wherein the first group includes $X^j$'s that satisfy $a^T X^j \geq L^{(K)}$, and the second group includes remainders.

16. The system according to claim 12, wherein the third group includes $V^j$'s whose corresponding $X^j$'s belong to the first group, and the fourth group includes remaining $V^j$'s.

17. A computer program product for measuring a risk of an asset portfolio including n number of assets, the computer program product comprising a storage medium readable by a processing circuit and storing instructions run by the processing circuit for performing a method, the method comprising:
  estimating a β-level CVaR (Conditional Value-at-Risk) of the portfolio by calculating $$CVaR_\beta(L) = \left(\sum_{j=S}^{J} w^{(j)} a^T Y^j\right) \bigg/ \left(\sum_{j=S}^{J} w^{(j)}\right),$$

where β is a real number between 0 and 1, L is a total portfolio loss, j is an index, J is an integer representing a specific number of sample points, S is a largest integer between 1 and J such that a sum of $w^{(j)}$ from S and J is larger than $J(1-\beta)$, where $w^{(j)}$ is a likelihood ratio of a j-th smallest empirical loss, $a^T Y^j$ is an empirical loss.

18. The computer program product according to claim 17, wherein the method further comprises:
  capturing an interdependency between the assets in the portfolio using a Gaussian copula model.

19. The computer program product according to claim 18, wherein the Gaussian copula model is represented by n marginal Cumulative Distribution Functions (CDF) $F_i(\cdot)$ and a n×n matrix $\Sigma_Z$ wherein $F_i(\cdot)$ is a marginal CDF of a potential loss of an asset i, and $\Sigma_Z$ is a correlation matrix that captures interdependencies among asset losses.

20. The computer program product according to claim 19, wherein the estimating the β-level CVaR further includes steps of:

applying a matrix decomposition technique on the correlation matrix $\Sigma_Z$ to decompose the correlation matrix $\Sigma_Z$ as $\Sigma_Z = U^T D U$, where D is a diagonal matrix with non-negative diagonal entries, and U is a unitary matrix;

generating J number of sample points $V^1, \ldots, V^J$ from a standard n-dimensional multivariate normal distribution whose mean value is zero and whose correlation matrix is an n×n identify matrix, and creating J number of points $Z^1, \ldots, Z^J$, by multiplying $D^c$ and $U^T$ to $V^1, \ldots, V^J$ as $Z^j = D^{1/2} U^T V^j$ where a sample point index j ranges from 1 to J;

creating J number of points $X^1, \ldots, X^J$ by calculating $X_i^j = F_i^{-1}(\Phi(Z_i^j))$ where the asset i ranges from 1 to n, the sample point index j ranges from 1 to J, $Z_i^j$ is the i-th entry of $Z^j$, $X_i^j$ is an i-th entry of $X^j$, $F_i^{-1}(\cdot)$ is the inverse function of $F_i(\cdot)$ and $\Phi(\cdot)$ is the univariate standard normal CDF;

computing empirical losses $L^1, \ldots, L^J$ as $L^j = a^T X^j$, where the index j ranges from 1 to J, then sorting $L^1, \ldots, L^J$ in an ascending order, denoting the sorted $L^1, \ldots, L^J$ with $L^{(1)} \leq \ldots \leq L^{(J)}$ and determining a largest integer K such that $J-K \geq J(1-\beta)$ so that $K = \max\{j | J-j \geq J(1-\beta), j=1, \ldots, J\}$;

estimating a β-level VaR of total portfolio loss L as $L^{(K)}$;

dividing points $X^1, \ldots, X^J$ into two groups, a first group and a second group;

dividing points $V^1, \ldots, V^J$ into two groups, a third group and a fourth group, according to the divided points $X^1, \ldots, X^J$;

finding a hyper-plane that separates the third group and the fourth group, and representing the separating hyper-plane as $f(x) = k^T x - b = 0$, where k is a unit normal vector ($k^T k = 1$) of the hyper-plane, |b| (the absolute value of b) is a distance from an origin (0,0) to the hyper-plane;

computing a shifting amount ΔZ as $\Delta Z = b D^{1/2} U^T k$;

shifting the points $Z^1, \ldots, Z^J$ by ΔZ, and creating points $Y^1, \ldots, Y^J$ from the shifted points as $Y_i^j = F_i^{-1}(\Phi(Z_i^j + \Delta Z_i))$, where the asset i ranges from 1 to n, the index j ranges 1 to J;

computing a set of likelihood ratios $w^1, \ldots, w^J$ as $$w^j = \frac{\phi_Z(Z^j + \Delta Z)}{\phi_{Z+\Delta Z}(Z^j + \Delta Z)},$$

where the index j ranges from 1 to J, $\phi_Z(\cdot)$ is a joint probability density function (PDF) of a n-dimensional multivariate normal distribution whose mean value is zero, and whose correlation matrix is the correlation matrix $\Sigma_Z$, and $\phi_{Z+\Delta Z}(\cdot)$ is a joint PDF of a n-dimensional multivariate normal distribution whose mean value is $\Delta Z = b D^{1/2} U^T k$ and whose correlation matrix is the correlation matrix $\Sigma_Z$;

computing exaggerated empirical losses $\tilde{L}^1, \ldots, \tilde{L}^J$ as $\tilde{L}^j = a^T Y^j$, $j=1, \ldots, J$, and sorts $\tilde{L}^1, \ldots, \tilde{L}^J$ in an ascending order, and denoting the sorted $\tilde{L}^1, \ldots, \tilde{L}^J$ as $\tilde{L}^{(1)}, \ldots, \tilde{L}^{(J)}$ with $\tilde{L}^{(1)} \leq \ldots \leq \tilde{L}^{(J)}$; and finding the largest integer S so that $$S = \max\left\{ s \;\middle|\; \sum_{j=s}^{J} w^{(j)} \geq J(1-\beta), s=1, \ldots, J \right\}.$$

21. The computer program product according to claim 20, wherein the matrix decomposition technique includes a singular value decomposition technique.

22. The method according to claim 1, wherein $a^T$ represents a transpose of column vector a, a is $[a_1, \ldots, a_n]^T$, where $a_i$ (i=1, \ldots, n) denotes a number of shares invested in an asset i and $Y^j$ is a shifted sample point.

23. The system according to claim 9, wherein $a^T$ represents a transpose of column vector a, a is $[a_1, \ldots, a_n]^T$, where $a_i$ (i=1, \ldots, n) denotes a number of shares invested in an asset i and $Y^j$ is a shifted sample point.

24. The computer program product according to claim 17, wherein $a^T$ represents a transpose of column vector a, a is $[a_1, \ldots, a_n]^T$, where $a_i$ (i=1, \ldots, n) denotes a number of shares invested in an asset i and $Y^j$ is a shifted sample point.

* * * * *